United States Patent

Kim

[11] Patent Number: 5,872,606
[45] Date of Patent: Feb. 16, 1999

[54] METHOD OF MOUNTING LIQUID CRYSTAL DISPLAY MODULE AND APPARATUS THEREOF

[75] Inventor: Yong Gyu Kim, Kyungsangbuk-Do, Rep. of Korea

[73] Assignee: LG Electronics Inc., Seoul, Rep. of Korea

[21] Appl. No.: 10,491

[22] Filed: Jan. 21, 1998

[30] Foreign Application Priority Data

May 24, 1997 [KR] Rep. of Korea ................. 97-20550

[51] Int. Cl.$^6$ ................. G02F 1/1333; H05K 7/02; G06F 1/16
[52] U.S. Cl. ................. 349/58; 361/681; 345/905
[58] Field of Search ................. 349/1, 58, 59, 349/60; 361/681, 683; 248/923; 345/903, 905; 364/708.1

[56] References Cited

U.S. PATENT DOCUMENTS

| | | | |
|---|---|---|---|
| 4,111,533 | 9/1978 | Nakamura et al. | 350/337 |
| 4,165,607 | 8/1979 | Fedorowicz et al. | 58/50 |
| 4,422,728 | 12/1983 | Andreaggi | 350/334 |
| 4,755,035 | 7/1988 | Kopish et al. | 350/345 |
| 4,781,422 | 11/1988 | Kimble | 312/72 |
| 4,937,709 | 6/1990 | Yanagi et al. | 362/31 |
| 4,959,887 | 10/1990 | Gruenberg et al. | 16/223 |
| 5,102,084 | 4/1992 | Park | 248/286 |
| 5,103,377 | 4/1992 | Kobayashi et al. | 361/394 |
| 5,168,426 | 12/1992 | Hoving et al. | 361/392 |
| 5,173,837 | 12/1992 | Blackwell et al. | 361/380 |
| 5,195,213 | 3/1993 | Ohgami et al. | 16/342 |
| 5,216,411 | 6/1993 | Ashitomi et al. | 349/58 |
| 5,229,920 | 7/1993 | Spaniol et al. | 361/681 |
| 5,233,502 | 8/1993 | Beatty et al. | 349/58 |
| 5,238,421 | 8/1993 | Kobayashi | 439/165 |
| 5,276,589 | 1/1994 | Bartlett et al. | 361/681 |
| 5,328,379 | 7/1994 | Kobayashi | 439/165 |
| 5,432,626 | 7/1995 | Sasuga et al. | 359/83 |

(List continued on next page.)

FOREIGN PATENT DOCUMENTS

| | | |
|---|---|---|
| 0317261 | 5/1989 | European Pat. Off. . |
| 425793 | 6/1991 | European Pat. Off. . |
| 0532284 | 3/1993 | European Pat. Off. . |
| 0604872 | 7/1994 | European Pat. Off. . |
| 4120950 | 12/1992 | Germany . |
| 0123759 1A | 9/1989 | Japan . |
| 1237591 | 9/1989 | Japan . |
| 05080334 | 2/1993 | Japan . |
| 07199180 | 8/1995 | Japan . |
| 07281184 | 10/1995 | Japan . |
| 2305689 | 4/1997 | United Kingdom . |
| 2305690 | 4/1997 | United Kingdom . |

OTHER PUBLICATIONS

"14.2" XGA (Ver.2) Technical Data, AA142XB11, Advanced Display Inc. No date.

Structure Design for Liquid Crystal Display Module, IBM Technical Disclosure Bulletin, vol. 39, No. 1, Jan. 1996. S. 71–73.

High Efficiency Back Light for LCD, IBM Technical Disclosure Bulletin, vol. 33, No. 9, Feb. 1991, S. 261, 262.

JP 2–79893 Patents Abstracts of Japan, P–1061, Jun. 13, 1990, vol. 14, No. 274.

IBM Technical Disclosure Bulletin, vol. 37, No. 12, Dec. 1994 entitled "Cell Support Assembly without Screw".

Primary Examiner—William L. Sikes
Assistant Examiner—Tai V. Duong
Attorney, Agent, or Firm—Loeb & Loeb LLP

[57] ABSTRACT

A method of mounting a liquid crystal display module thereof which secures an upper sash including the liquid crystal display module to a lower sash in a notebook personal computer. An arm coupled to one end of a fixed rod by a hinge is arranged to be positioned between a side wall of the upper sash and a side wall of the lower sash. A screw goes through from the side wail of the upper sash, via the arm, to the side wall of the liquid crystal display module.

26 Claims, 4 Drawing Sheets

U.S. PATENT DOCUMENTS

| | | | |
|---|---|---|---|
| 5,467,504 | 11/1995 | Yang | 16/342 |
| 5,494,447 | 2/1996 | Zaidan | 361/681 |
| 5,504,605 | 4/1996 | Sukuma et al. | 359/83 |
| 5,559,670 | 9/1996 | Flint et al. | 361/681 |
| 5,566,048 | 10/1996 | Esterberg et al. | 361/681 |
| 5,583,529 | 12/1996 | Satou | 345/905 |
| 5,634,351 | 6/1997 | Larson et al. | 62/259.2 |
| 5,636,101 | 6/1997 | Bonsall et al. | 361/681 |
| 5,636,102 | 6/1997 | Fujino et al. | 361/681 |
| 5,654,779 | 8/1997 | Nakayama et al. | 349/58 |
| 5,666,172 | 9/1997 | Ida et al. | 349/58 |
| 5,680,183 | 10/1997 | Sasuga et al. | 349/58 |
| 5,682,645 | 11/1997 | Watabe et al. | 16/338 |
| 5,771,539 | 6/1998 | Wahlstedt et al. | 16/285 |
| 5,805,125 | 9/1998 | Suganuma et al. | 361/681 |

METHOD OF MOUNTING LIQUID CRYSTAL DISPLAY MODULE AND APPARATUS THEREOF

This application claims the benefit of Korean Patent Application No. 97-20550, filed in Korea on May 24, 1997, which is hereby incorporated by reference.

BACKGROUND OF THE INVENTION

1. Field of the Invention

The present invention relates to a computer having a liquid crystal display module, and more particularly, to a method of mounting a liquid crystal display module in a computer such as a notebook personal computer (hereinafter referred to as "NTPC").

2. Description of the Related Art

Generally, a conventional NTPC is manufactured having a size that allows a user to exploit information in the course of his travels. In such an NTPC, a liquid crystal display (LCD) module is used as the display device for displaying the information. The liquid crystal display module has to be protected from being damaged when moving the computer system including the LCD module and a keyboard. Also, the LCD module has to be secured to a sash (or moveable frame) so it may be opened at time of use. To this end, the liquid crystal display module was provided at a bottom surface or an inner surface such that it overlapped with the keyboard installed on a top surface or an inner surface, or that it is opened for a user together with the keyboard, as the upper sash pivots with respect to one side of the lower sash.

FIG. 1 is a front view of a conventional notebook personal computer and FIG. 2 is a side view of the conventional notebook personal computer. Referring to FIGS. 1 and 2, in the conventional NTPC, a liquid crystal display module and an upper sash 12 are pivotally secured to a lower sash 10 by a hinge 20, as shown in FIG. 1. A protection rod 14a is defined in the edge of the liquid crystal display module 14, and a support piece 14b is defined in the protection rod 14a. This support piece 14b is secured to the bottom surface or inner surface of the upper sash 12 by means of screws 22, thereby supporting the liquid crystal display module 14 in such a manner that it is not moved.

Meanwhile, the hinge 20 pivotally couples an arm 18 with one end of a fixed rod 16. This fixed rod 16 is secured to the inner side, that is, to the rear wall of the lower sash 10 by means of the screw, 22. The arm 18 is secured to the bottom surface or inner surface of the upper sash 12 by means of the screws 22, thereby supporting the liquid crystal display module 14 and the upper sash 12 in such a manner that they pivot with respect to the upper end of the rear wall of the upper sash 10. Further, an arm 16 is formed in the shape of an "F" such that it can sufficiently bear the load of the upper sash 12, that is, it makes good contact with the bottom surface of the upper sash 12.

In the conventional NTPC, as described above, the hinge 20 and the liquid crystal display module 14 are secured to the bottom surface of the upper sash 12 separately. This brings about a complication in the manufacturing process. Also, since the arm occupies a great area in the upper sash, the available area of the display portion, that is, the liquid crystal display module, becomes small. This increases the dimension of the NTPC.

SUMMARY OF THE INVENTION

Accordingly, the present invention is directed to a method of mounting a liquid crystal display module and an apparatus thereof that substantially obviates one or more of the problems due to limitations and disadvantages of the related art.

An object of the present invention is to provide a method of mounting a liquid crystal display module and an apparatus thereof that can minimize a manufacturing process of the NTPC.

Another object of the present invention is to provide a method of mounting a liquid crystal display module and an apparatus thereof that can minimize the dimension of NTPC.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of mounting a liquid crystal display module in a computer having an upper sash, a lower sash, and a fixed rod coupling the upper sash to the lower sash, the upper sash including the liquid crystal display module, a hinge coupled to the fixed rod, and an arm coupled to the hinge, comprises the steps of arranging the arm, coupled to one end of the fixed rod through the hinge in the upper sash, to be positioned between a side wall of the upper sash a side wall of the liquid crystal display module; and fastening together the side wall of the upper sash and the side wall of the liquid crystal display module through the arm.

In another aspect of the present invention, a mounting apparatus of a liquid crystal display module in a computer including an upper sash secured pivotally to a lower sash thereof, the liquid crystal display module being installed in the upper sash, comprises a fixed rod secured to an inner side af the lower sash; a hinge coupled to the fixed rod; an arm coupled pivotally to one end of the fixed rod through the hinge; and a screw securing the upper sash and the liquid crystal display module through the arm.

In another aspect of the present invention, a method of mounting a liquid crystal model comprises the steps of arranging an arm coupled with one end of a fixed rod by a hinge in such a manner that it is disposed between a side wall of the upper sash and a side wall of the liquid crystal display module, and going through a screw from the side wall of the upper sash to the side wall of the liquid crystal display module by way of the arm.

In a further aspect of the present invention, a mounting apparatus of a liquid crystal display module in a notebook personal computer which includes an upper sash secured pivotally to a lower sash thereof and a liquid crystal display module installed to the upper sash, comprises a fixed rod secured to the inner side of the lower sash, and an arm coupled pivotally with one end of the fixed rod by a hinge, and secured to a side wall of the upper sash by a screw along with the liquid crystal display module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
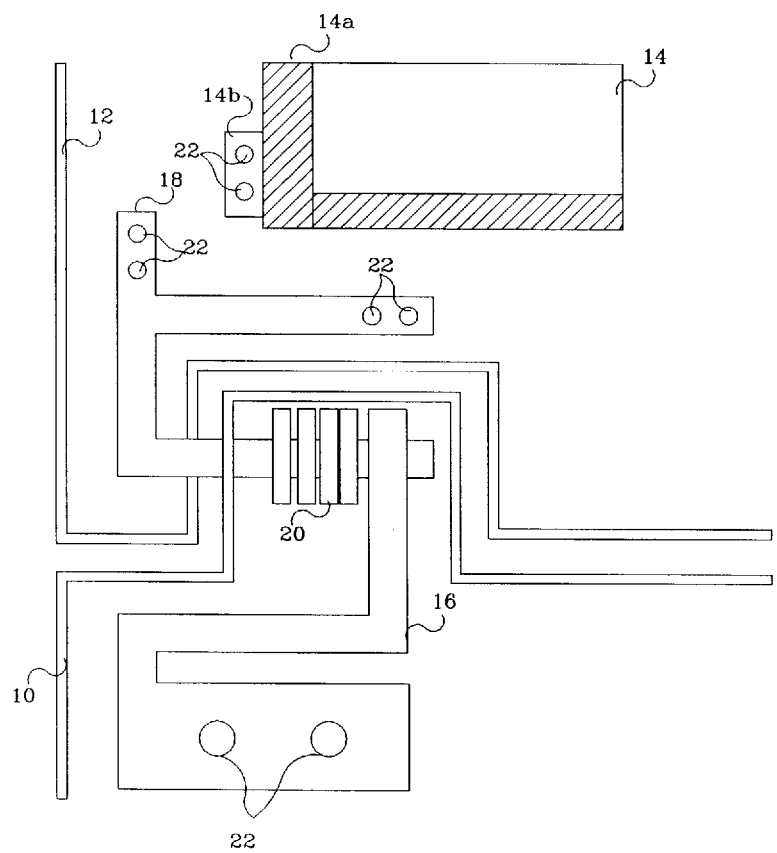
FIG. 1 is a front section view of the conventional notebook personal computer.
Figure 2:
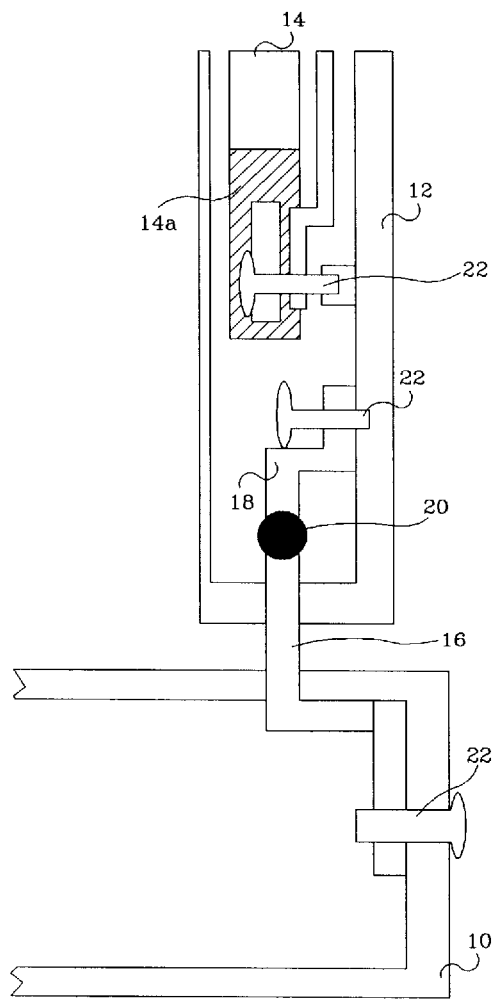
FIG. 2 is a side section view of the conventional notebook personal computer.
Figure 3:
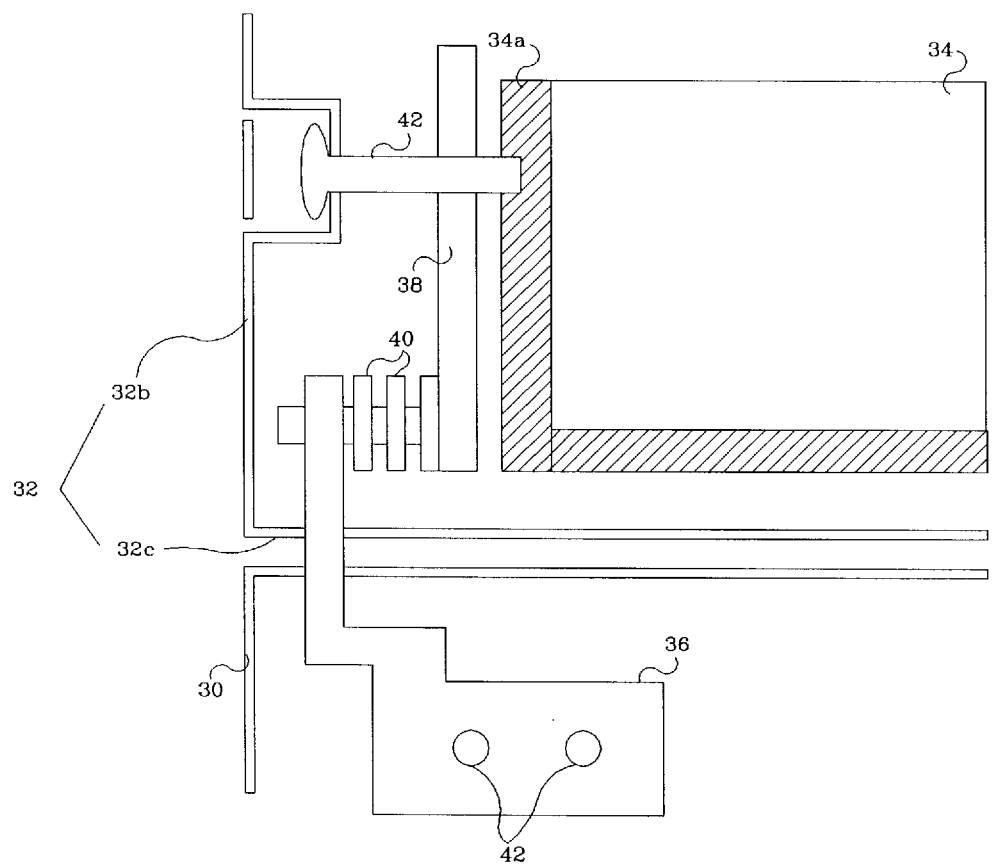
FIG. 3 is a front section view of a notebook personal computer according to an embodiment of the present invention.
Figure 4:
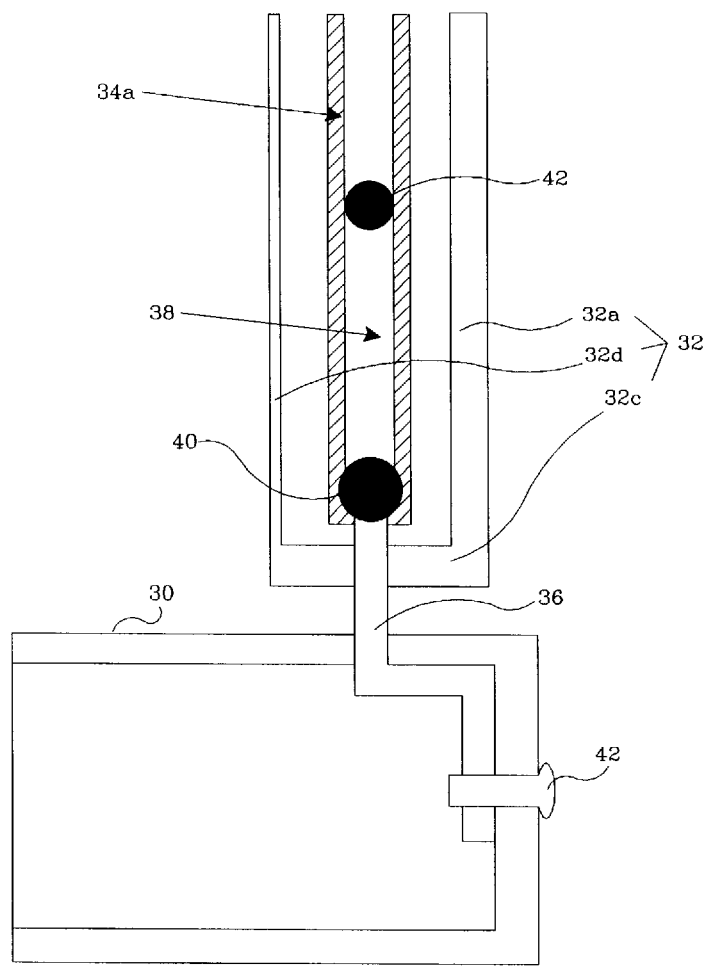
FIG. 4 is a side section view of a notebook personal computer according to an embodiment of the present invention.

FIG. 3 is a front section view of an NTPC employing a mounting apparatus for a liquid crystal display module according to an embodiment of the present invention, and FIG. 4 is a side section view of an NTPC employing a mounting apparatus for a liquid crystal display module according to an embodiment of the present invention.

Referring to FIGS. 3 and 4, the NTPC includes an upper sash 32 pivotally secured to a lower sash 30 by a hinge 40. This upper sash 32 is provided with a liquid crystal display module 34, and the edges or side walls of the liquid crystal display module 34, are provided with a protection rod 34a. The upper sash 32 has a rectangular plastic plate 32a, side walls 32b extending perpendicularly from the plastic plate 32a, a front wall not shown, and a rear wall 32c. Further, there is provided a blade 32d extending in parallel with the plastic plate 32a or extending with a slant toward the plastic plate 32a, in the upper ends of these walls, that is, the side walls 32b, front wall, and rear wall 32c.

Meanwhile, the hinge 40 pivotally couples an arm 38 with one end of a fixed rod 36. This fixed rod 36 goes through a hole, not shown, defined from a middle position of the rear wall 32c of the uppers sash 32 to the end position of the blade 32d and a hole, not shown, defined from the rear side end of the upper plate of the lower sash 30, and then extends to the inner side of the lower sash 30. Further another side of the fixed rod 36 is secured to the inner face of the rear wall of the lower sash 30 by means of screws 42. The arm 38 is formed in such a manner that it extends from the hinge 40 by a length of the side face of the liquid crystal display module 34. The arm 38 also opposes the protection rod 34a and the side wall 32b of the upper sash 32. Thus, the arm 38 is secured by the screw 42 to be positioned between the protection rod 34a and the side wall 32b of the upper sash 32. At this time, the screw 42 passes through the side wall 32b of the upper sash 32 and the 38 and then reaches a middle position of the protection rod 34a, thereby coupling both of the liquid crystal display module 34 and the arm 38 with the upper sash 32. Accordingly, both of tile upper sash 32 and the liquid crystal display module 34 pivots with respect to the rear side edge of the lower sash 30 along with the arm 38. Also, an occupied area of the arm 38 at the upper sash 32 is reduced. In addition, although the hinge is disposed at the inner side of the upper sash 32 in the present embodiment, it may be disposed at the lower sash 30 for the sake of reducing the size of the upper sash 32.

As described above, according to an liquid crystal display module mounting apparatus of the present invention, it is possible to reduce a manufacturing process of the NTPC by securing the arm and the liquid crystal display module to the side wall of the upper sash. Also, the liquid crystal display module mounting apparatus of the present invention can increase the available area of the display portion as well as a reduction in the dimension of NTPC.

It will be apparent to those skilled in the art that various modifications and variations can be made in the method of mounting liquid crystal display module and apparatus thereof of the present invention without departing from the spirit or scope of the invention. Thus, it is intended that the present invention cover the modifications and variations of this invention provided they come within the scope of the appended claims and their equivalents.

What is claimed is:

1. A method of mounting a liquid crystal display module in a computer having an upper sash, a lower sash, and a fixed rod coupling the upper sash to the lower sash, the upper sash including the liquid crystal display module, a hinge coupled to the fixed rod, and an arm coupled to the hinge, the method comprising the steps of:

arranging the arm, coupled to one end of the fixed rod through the hinge, to be positioned between a side wall of the upper sash and a side wall of the liquid crystal display module; and fastening together the side wall of the upper sash and the side wall of the liquid crystal display module through the arm.

2. The method of mounting a liquid crystal display module according to claim 1, wherein the fastening step uses a fastener penetrating the side wall of the upper sash and the arm and partially penetrating the liquid crystal display module.

3. The method of mounting a liquid crystal display module according to claim 2, wherein the fastening step uses a screw as the fastener.

4. The method of mounting a liquid crystal display module according to claim 1, further comprising the step of positioning the hinge at an inner side of the upper sash.

5. A mounting apparatus of a liquid crystal display module in a computer including an upper sash secured pivotally to a lower sash thereof, the liquid crystal display module being installed in the upper sash, comprising:

a fixed rod secured to an inner side of the lower sash;

a hinge coupled to the fixed rod;

an arm coupled pivotally to one end of the fixed rod through the hinge; and a fastener securing the upper sash and the liquid crystal display module through tile arm at a sidewall of the liquid crystal display module after.

6. The mounting apparatus according to claim 5, wherein the hinge is positioned at an inner side of the upper sash.

7. The mounting apparatus according to claim 5, wherein the fastener includes a screw.

8. A mounting apparatus of a liquid crystal display module in a computer including an upper sash secured pivotally to a lower sash thereof, the liquid crystal display module being installed in the upper sash, comprising:

means for securing a fixed rod to an inner side of the lower sash;

a hinge coupled to the fixed rod;

means for pivotally coupling an arm to one end of the fixed rod through the hinge; and means for securing the upper sash and the liquid crystal display module through the arm at a sidewall of the liquid crystal display module.

9. The mounting apparatus according to claim 8, wherein the hinge is positioned at an inner side of upper sash.

10. The mounting apparatus according to claim 8, wherein the securing means includes a screw.

11. A liquid crystal display unit including an upper portion coupled to a lower portion, the upper portion including a liquid crystal display module, comprising:

a fixed member secured to the lower portion;

a hinge coupled to the fixed member;

an arm coupled pivotally to the fixed member through the hinge; and a fastener securing the upper portion and the liquid crystal display module through the arm at a sidewall of the liquid crystal display module.

12. The liquid crystal display unit according to claim 11, wherein the fastener penetrates a part of the upper portion and the arm and at least partially penetrates the liquid crystal display module.

13. The liquid crystal display unit according to claim 12, wherein the liquid crystal display module includes a protection rod and the fastener at least partially penetrates the protection rod of the liquid crystal display module.

14. The liquid crystal display unit according to claim 11, wherein the fastener includes a screw.

15. The liquid crystal display unit according to claim 11, wherein the upper portion has at least one hole at an outer edge, and the upper portion, the liquid crystal display module, and the arm are fastened together through the at least one hole at the outer edge of the upper portion.

16. A liquid crystal display unit including an upper portion coupled to a lower portion, the upper portion including a liquid crystal display module, comprising:

means for securing a fixed member to the lower portion;

means for coupling a hinge to the fixed member;

means for pivotally coupling an arm to the fixed member through the hinge; and means for fastening the upper portion and the liquid crystal display module through the at a sidewall of the liquid crystal display module.

17. A method of mounting a liquid crystal display module in a computer having an upper portion, a lower portion, a fixed member coupling the upper portion to the lower portion, a hinge coupled to the fixed member, and an arm coupled to the hinge, the upper portion including the liquid crystal display module having a protection rod, the method comprising the steps of:

arranging the arm, coupled to the fixed member through the hinge in the upper portion, to be positioned between a side wall of the upper portion and the protection rod of the liquid crystal display module; and fastening together the side wall of the upper portion and the protection rod through the arm.

18. The method according to claim 17, wherein the fastening step uses a fastener penetrating the side wall of the upper portion and the arm and at least partially penetrating the protection rod of the liquid crystal display module.

19. The method according to claim 17, wherein the fastening step uses a screw as the fastener.

20. The method according to claim 17, wherein the side wall of the upper portion is fastened to the protection rod of the liquid crystal display module directly through the arm.

21. The method according to claim 17, wherein the side wall of the upper portion has at least one hole at an outer edge, and the side wall of the upper portion, the liquid crystal display module, and the arm are fastened together through the at least one hole at the outer edge of the upper portion.

22. A portable computer comprising:

an upper portion including a display module;

a lower portion;

a fixed member coupling the upper portion to the lower portion;

a hinge coupled to the fixed member; and an arm coupled to the hinge and positioned between a side wall of the upper portion and the display module;

wherein the side wall of the upper portion and the display module are fastened together through the arm.

23. The portable computer according to claim 22, wherein a fastener penetrates the side wall of the upper portion and the arm and at least partially penetrates the display module.

24. The portable computer according to claim 23, wherein the fastener includes a screw.

25. The portable computer according to claim 22, wherein the side wall of the upper portion is fastened to a protection rod of the display module directly through the arm.

26. The portable computer according to claim 22, wherein the side wall of the upper portion has at least one hole at an outer edge, and the side wall of the upper portion, the display module, and the arm are fastened together through the at least one hole at the outer edge of the upper portion.

* * * * *